United States Patent
Roush et al.

(10) Patent No.: US 6,526,857 B1
(45) Date of Patent: Mar. 4, 2003

(54) SURFACE MOUNTED ERGONOMIC CUTTER

(76) Inventors: Jean Ray Roush, 350 W. Main St., Capron, IL (US) 61012; Darlene June Roush, 350 W. Main St., Capron, IL (US) 61012

(*) Notice: Subject to any disclaimer, the term of this patent is extended or adjusted under 35 U.S.C. 154(b) by 0 days.

(21) Appl. No.: 09/676,759

(22) Filed: Oct. 2, 2000

(51) Int. Cl.[7] .............. B26B 13/12; B26D 5/08
(52) U.S. Cl. .............. 83/574; 83/605; 30/92; 30/122; 30/192; 30/231; 30/254; 30/296.1
(58) Field of Search .............. 83/200, 199, 198, 83/597, 602, 604, 605, 607, 694, 633, 630, 574; 30/92, 94, 95, 93, 231, 254, 250, 251, 252, 260, 296.1, 194, 203, 204, 244, 248, 341, 342, 186, 190, 191, 192, 193; 16/421, 430, 324, 335

(56) References Cited

U.S. PATENT DOCUMENTS

| | | | | |
|---|---|---|---|---|
| 939,627 A | * | 11/1909 | Potstada .............. | 30/241 |
| 2,086,863 A | * | 7/1937 | Geddes .............. | 30/193 |
| 2,288,385 A | * | 6/1942 | Beard .............. | 30/197 |
| 2,667,923 A | * | 2/1954 | Tilden .............. | 269/303 |
| 3,049,956 A | * | 8/1962 | Lynch, Sr. .............. | 30/179 |
| 3,220,294 A | * | 11/1965 | Bradburn, Sr. .............. | 83/580 |
| 4,249,308 A | * | 2/1981 | Boyajian .............. | 30/231 |
| 4,747,213 A | * | 5/1988 | Armstrong .............. | 30/231 |
| 5,261,303 A | * | 11/1993 | Strippgen .............. | 16/324 |
| 5,988,027 A | * | 11/1999 | Lenox .............. | 83/13 |

* cited by examiner

Primary Examiner—Boyer D. Ashley

(57) ABSTRACT

A manually operated modified bolt cutter is placed in a fixture supporting a bolt cutter in a reversed operating position allowing the operator to cut small dimension materials using a one hand or arm pushing motion instead of the two hand or arm compression motion. The fixture holding the bolt cutter is fixedly mounted on a bench or like support and has two upright members between which is held one handle of the bolt cutter. Bolts through the side members and one handle support the bolt cutter in the fixture. When the moveable handle is in a near vertical position the jaws of the cutter are open. When the moveable handle is pushed away from the operator, toward the rear of the cutter, the jaws close making the cut. The moveable handle is bent at an angle to decrease the operator's wrist to arm angle.

1 Claim, 1 Drawing Sheet

SURFACE MOUNTED ERGONOMIC CUTTER

FIELD OF INVENTION

This invention relates to hand tools used in cutting. More specifically, this invention relates to an ergonomically improved conventional bolt cutter.

BACKGROUND OF INVENTION

The cutting of small dimension materials, wire, brass rod, sheet stock, etc. has generally been accomplished with diagonals, side cutters, pliers or snips. These hand tools operate by spreading the handles to open the cutter head, pointing the cutter head away from the operator, loading the material to be cut between the cutting jaws and compressing the handles together between the fingers and thumb in a squeezing motion, wherein, the cutter closure is complete. Such action can be difficult for people with hand grasp difficulties and overtime some may develop frustration and pain in the hand, wrist, or arm. This invention makes it possible to cut wire and other materials with less stress to the operator because the cutter does not require squeezing of fingers or hand.

DESCRIPTION OF PRIOR ART

The present invention incorporates a conventional bolt cutter to cut small dimension materials and gives rise to previous art involving bolt and rod cutters. For example, U.S. Pat. No. 5,988,027 to Lenox, U.S. Pat. No. 5,261,303 to Strippgen are rod cutters. U.S. Pat. No. 3,220,294 to Bradburn, Sr. cuts gasket materials. In each instance cuts are made by vertical compression of a moveable handle against a fixed plate. U.S. Pat. No. 2,288,385 to Beard is designed to cut rivets. Horizontal compression between a moveable handle and a stationary fixture shear the rivet. U.S. Pat. No. 2,086,863 to Geddes and U.S. Pat. No. 4,249,308 to Boyajian are conventional bolt cutters. Geddes applies additional force with a foot pedal. Boyajian increases mechanical advantage by a cutter head arrangement. Finally, U.S. Pat. No. 4,747,213 to Armstrong is a fixture that makes stationary one of a pair of snips or shears. In each instance cuts are completed by compression between a moveable and fixed handle.

SUMMARY OF THE INVENTION

The present invention includes a conventional bolt cutter, a fixed base, and a modified moveable handle, so arranged to cut small dimension material. The base plate has two upright members attached to its top surface. Mounted between the upright members is positioned one handle of a bolt cutter. The upright members and the fixed handle are drilled to receive two bolts, which give vertical stability and fix the bolt cutter at an angle sufficient to provide clearance between the cutter head and the base when the cutter jaws are open. The moveable handle is bent at an angle to decrease the operator's arm to wrist angle when the cutter head is closed. The moveable handle has a foam handgrip attached to soften the contact between the hand and cutter handle.

BRIEF DESCRIPTION OF THE DRAWINGS

For further understanding of the nature and object of the present invention, reference should be had to the following description taken in connection with the accompanying drawings wherein.

Figure 2:
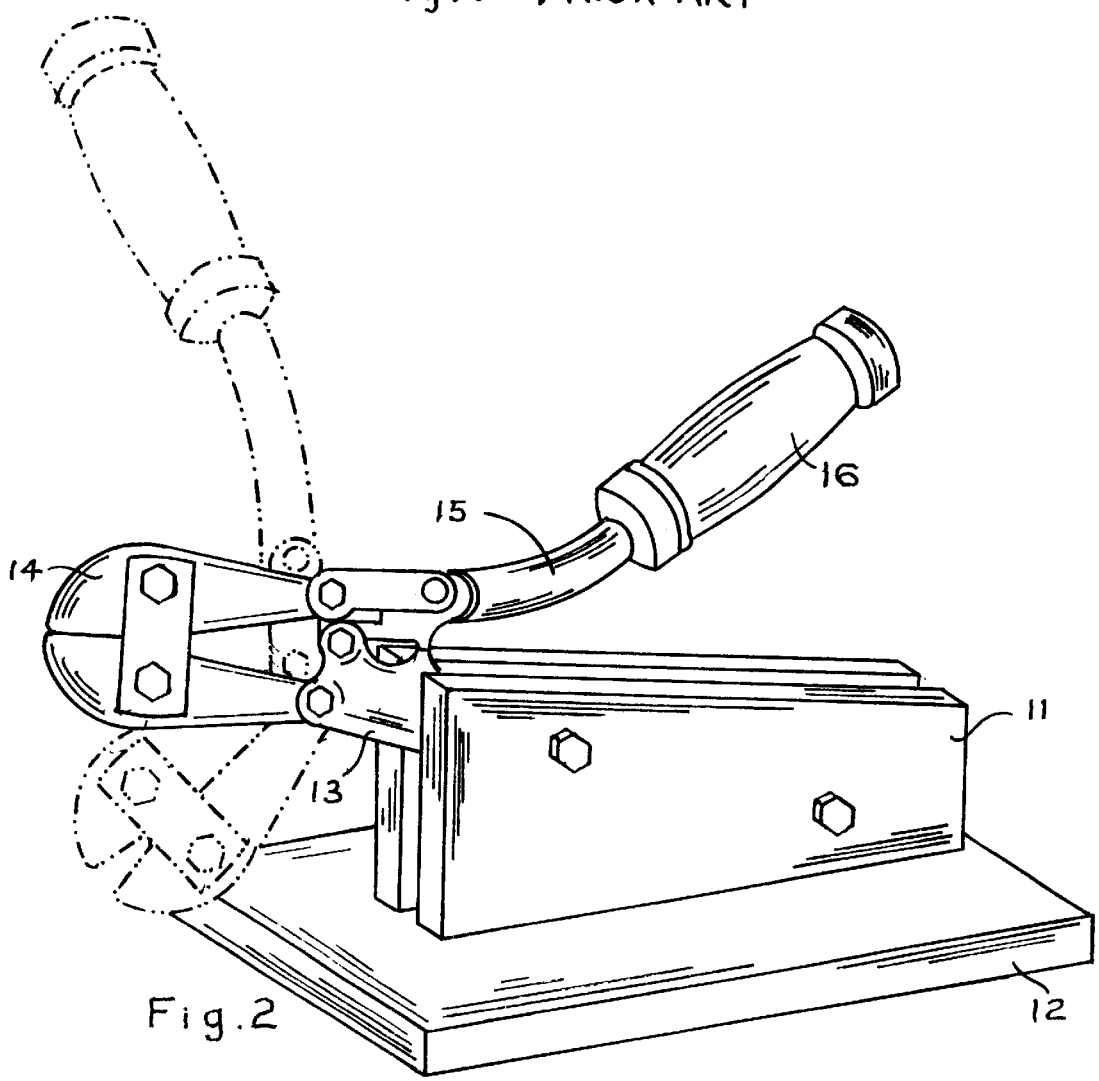
FIG. 2 is a ide elevational view of the present invention shown in the closed position and shown with dashed lines in the open position.

| Reference Numerals in Drawing FIG. 2 | |
| --- | --- |
| 11. Support | 14. Cutter head |
| 12. Base | 15. Moveable Handle |
| 13. Fixed Handle | 16. Foam Grip |

The following invention will be described in connection with a preferred embodiment; it will be understood, however that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE DRAWINGS

Figure 1:
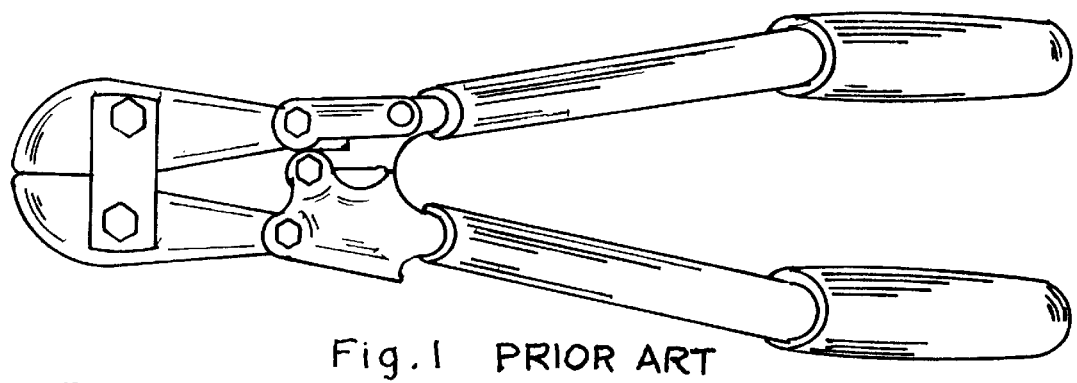
FIG. 1 is a side elevational view of a conventional bolt cutter.

Referring now to the drawings, a conventional bolt cutter (FIG. 1) incorporated in the invention, (FIG. 2). The fixture will hold the bolt cutter in a position suitable to cut the material with one hand, leaving the other hand to guide the material to be cut. The fixed handle 13 is set at an angle so that the cutter head 14 will not touch the base 12 or be obstructed by the support 11. The angle needed to give clearance to the cutter head and nearly parallel arms presented an uncomfortable angle between the wrist and the arm at the finished end of the cut. To overcome this problem the moveable handle 15 is bent about 15° relative to the base.

Operation of the cutter consists of pulling the moveable handle 15 toward the operator. This drops the cutter head 14 and opens the cutter head to receive the material to be cut, placing the material to be cut between the cutter head 14 jaws and pushing the moveable handle 15 away from the operator to the fully closed position will cut the material. The addition of a soft sponge grip 16 on the moveable handle 15 accommodates the hand and fingers.

We claim:

1. A bolt cutting apparatus operable with one hand thereby freeing a user's other hand for holding a workpiece during a cutting operation, said bolt cutting apparatus comprising:

a flat horizontal base with a fixture support extending vertically from the base, the fixture support including two upstanding walls spaced apart with a front end and a rear end, the two upstanding walls having an inclined upper surface such that the height of the walls decreases along the length of the walls from the front end to the rear end;

a bolt cutting portion attached to the fixture support and extending from the front end of the walls of the fixture support at an angle commensurate with the inclined upper surface, said cutting portion having a cutting head section, an intermediate section, a fixed handle portion and a movable handle portion;

the intermediate section including a fixed arm and a movable link arm, the fixed arm and the movable link arm each having first and second ends;

the cutting head section of the bolt cutting portion includes first and second jaw members with a cutting end, having opposed cutting edges, and proximal ends, the first and second jaw members are connected to each other at the cutting end by two bolts and linking plates, the proximal end of the first jaw member pivotally connected to the first end of the fixed arm of the intermediate section and the proximal end of the second jaw member pivotally connected to the first end of the movable link arm, the second end of the movable link arm pivotally connected to a proximal end of the movable handle portion;

the fixed handle portion of the bolt cutting portion extending form the intermediate portion away from the cutting end and in between the two upstanding walls of the fixture support and fixed in place with bolts extending through the walls of the fixture support and the fixed handle portion;

the movable handle portion includes a curved bar member extending from the movable link arm to a handle grip end, wherein a foam grip surrounds the handle grip end, the movable handle portion extends over and is curved upward away from the upper surface of the walls of the fixture support when the first and second jaw members are closed together.

* * * * *